United States Patent
David et al.

(10) Patent No.: US 12,037,292 B2
(45) Date of Patent: Jul. 16, 2024

(54) PARTICULATE COMPOSITE CERAMIC MATERIAL, PART COMPRISING SAID MATERIAL, AND METHOD FOR THE PREPARATION OF SAID PART

(71) Applicant: COMMISSARIAT A L'ENERGIE ATOMIQUE ET AUX ENERGIES ALTERNATIVES, Paris (FR)

(72) Inventors: Patrick David, Saint-Cyr-sur-Loire (FR); Thierry Piquero, Fondettes (FR); Julien Martegoutte, Herin (FR); Frederic Schuster, Saint-Germain-en-Laye (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 631 days.

(21) Appl. No.: 16/766,991

(22) PCT Filed: Nov. 27, 2018

(86) PCT No.: PCT/FR2018/052999
§ 371 (c)(1),
(2) Date: May 26, 2020

(87) PCT Pub. No.: WO2019/106282
PCT Pub. Date: Jun. 6, 2019

(65) Prior Publication Data
US 2020/0392046 A1    Dec. 17, 2020

(30) Foreign Application Priority Data
Nov. 29, 2017 (FR) ..................................... 17 61375

(51) Int. Cl.
*C04B 35/628* (2006.01)
*C04B 35/571* (2006.01)
(Continued)

(52) U.S. Cl.
CPC ...... *C04B 35/62894* (2013.01); *C04B 35/571* (2013.01); *C04B 35/58092* (2013.01);
(Continued)

(58) Field of Classification Search
CPC ........ C04B 35/62834; C04B 2235/383; C04B 2235/3834
See application file for complete search history.

(56) References Cited

U.S. PATENT DOCUMENTS 4,455,385 A * 6/1984 Prochazka .............. C04B 35/56
501/88
2008/0265471 A1 * 10/2008 Colopy ............... C04B 35/6269
501/88

FOREIGN PATENT DOCUMENTS

JP    2003238249 A  *  8/2003

OTHER PUBLICATIONS

Machine translation JP-2003238249-A provided via espace.net (Year: 2023).*

(Continued)

*Primary Examiner* — Alexandre F Ferre
(74) *Attorney, Agent, or Firm* — Oblon, McClelland, Maier & Neustadt, L.L.P.

(57) ABSTRACT

A particulate composite ceramic material may include: particles of at least one first ultra-high-temperature ceramic "UHTC," the outer surface of the particles being at least partially covered by a porous layer made of at least one second UHTC in amorphous form; and the particles defining a space therebetween; optionally, porous clusters of the at least one second ultra-high-temperature ceramic in amorphous form, distributed in said space; a dense matrix and at least one third UHTC in crystallized form at least partially filling the space; optionally, a dense coating made of at least the third UHTC in crystallized form, covering the outer (Continued)

surface of the matrix, the matrix and the coating representing 5% to 90% by mass with respect to the total mass of the material. A part may include such a particulate ceramic composite material.

24 Claims, 5 Drawing Sheets

(51) Int. Cl.
    *C04B 35/58*     (2006.01)
    *C04B 38/04*     (2006.01)
    *B28B 1/00*     (2006.01)
    *B28B 1/26*     (2006.01)
    *B33Y 10/00*     (2015.01)
    *B33Y 70/10*     (2020.01)

(52) U.S. Cl.
    CPC .. *C04B 35/62834* (2013.01); *C04B 35/62884* (2013.01); *C04B 38/04* (2013.01); *B28B 1/001* (2013.01); *B28B 1/26* (2013.01); *B33Y 10/00* (2014.12); *B33Y 70/10* (2020.01); *C04B 2235/383* (2013.01); *C04B 2235/3834* (2013.01); *C04B 2235/3891* (2013.01); *C04B 2235/483* (2013.01); *C04B 2235/6026* (2013.01); *C04B 2235/614* (2013.01); *C04B 2235/85* (2013.01); *C04B 2235/9607* (2013.01); *Y10T 428/2993* (2015.01)

(56) References Cited

OTHER PUBLICATIONS

Justin, J.A., "Ultra High Temperature Ceramics: Densification, Properties and Thermal Stability", Journal Aerospace Lab, Issue 3, Nov. 2011, pp. 1-11.
Raju, K., et al., "Sintering additives for SiC based on the reactivity: a review", Ceramics International, vol. 42, 2016, pp. 17947-17962.
Kagawa, Y., et al., "Ultrahigh tem amic-based composites", Ceramic Matrix Composites, Wiley and Sons, 2015, pp. 273-292.
Ávila-Marín, A.L., "Volumetric receivers in Solar Thermal Power Plants with Central Receiver System technology: A review", Science Direct, Solar Energy, vol. 85, 2011, pp. 891-910.
Ni, D.-W., et al., "Pressureless sintering of HfB$_2$-SiC ceramics doped with WC", Journal of the European Ceramic Society, vol. 32, 2012, pp. 3627-3636.
Šajgalík, P., et al., "Additive-free hot-pressed silicon carbide ceramics—A material with exceptional mechanical properties", Journal of European Ceramic Society, vol. 36, 2016, pp. 1333-1341.
Colombo, P., "Polymer-Derived Ceramics; 40 years of rese and innovation in Advanced Ceramics". J. Am. Ceram. Soc., vol. 93, No. 7, 2010, pp. 1805-1837.
Heidenreich, B., "C/SiC and C/C-SiC composites", Ceramic Matrix Composites, Wiley and Sons, 2015, pp. 147-216.
Nannetti, C.A. et al., "Manufacturing SiC-fiber-reinforced SiC matrix composites by improved CVI/slurry Infiltration/Polymer impregnation and pyrolysis", J. Am. Ceram. Soc., vol. 87, No. 7, 2004, pp. 1205-1209.

\* cited by examiner

PARTICULATE COMPOSITE CERAMIC MATERIAL, PART COMPRISING SAID MATERIAL, AND METHOD FOR THE PREPARATION OF SAID PART

CROSS-REFERENCE TO RELATED APPLICATIONS

The present application is the national stage of international application PCT/FR2018/052999, filed on Nov. 27, 2018, and claims the benefit of the filing date of French Appl. No. 1761375, filed on Nov. 29, 2017.

TECHNICAL FIELD

The present invention relates to new ceramic materials that may be classified in the particulate composite ceramic materials.

Furthermore, the invention relates to a part comprising, preferably consisting of such a particulate composite ceramic material.

Finally, the invention relates to a method for the preparation of said part.

Particulate composite ceramic material generally means a material that comprises a matrix made of ceramic within which are located particles made of ceramic.

More specifically, the present invention relates to composite materials comprising particles of at least one ceramic selected from the Ultra-High-Temperature Ceramics (UHTC) and a matrix made of at least one ceramic also selected from the ultra-high-temperature ceramics.

In particular, said ultra-high-temperature ceramic may be silicon carbide (SiC).

PRIOR ART

SiC and the other ultra-high-temperature ceramics (UHTC) consisting of borides, carbides, and nitrides with high melting or decomposition point are compounds that have many interesting properties, in particular excellent mechanical, thermal or chemical properties, notably up to high temperature, or even up to very high temperature, namely up to a temperature greater than or equal to 2000° C. [1].

For example, SiC has excellent mechanical, thermal or chemical properties, up to 1500° C. or even 1600° C.

Such properties may vary significantly and are inseparable from the methods and conditions used for preparing said compounds.

These compounds may be used as pure compounds or in complex compositions [2] and have applications in extreme environments such as thermal protection, propulsion, furnace elements, refractory crucibles, structural compounds for future nuclear reactors [3], or even heat exchangers such as solar receivers [4].

Many types of monolithic SiC exist, having differences, inter alio, of structures and microstructures and having different properties. In general, they are named depending on the elaboration methods thereof.

Thus, are known SiC obtained by pressureless sintering, SiC obtained under Hot Isostatic Pressing (HIP), SiC obtained by Spark Plasma Sintering (SPS), SiC obtained by reactive sintering, SiC obtained by reaction between solid carbon and melted silicon (so-called reaction bonded SiC), SiC obtained by decomposition of pre-ceramic polymers (so-called PDCTs or Polymer Derived Ceramics SiC), SiC obtained by Polymer Impregnation Pyrolysis (PIP), CVD SiC obtained by Chemical Vapour Deposition (CVD), and CVI SiC obtained, for densifying composites, by Chemical Vapour Infiltration (CVI).

The other UHTC compounds may, in general, be obtained by the same processes as SiC and have, like same, properties that depend on the elaboration modes.

The pressureless sintering method is the simplest method but requires sintering additions (in general refractory oxides, for example $Al_2O_3$) allowing the formation of a liquid eutectic and the densification by sintering, pure SiC not sintering alone. The required temperatures are high, 1800° C. to 2100° C. The same principle may be applied to the preparation of particulate composites made of UHTC ceramics, also with high temperatures, 1650-2200° C., depending on the compositions [3]. In general, the additions are detrimental to the properties of the materials. With the pressureless sintering method, parts may be obtained that have dimensions closer to those targeted than the parts obtained with the HIP method or the Spark Plasma Sintering method [5].

The HIP method, consists of enclosing the powder, under vacuum, in a metal container, then applying a high temperature and a high pressure, typically 1850° C. and 2000 bars [3]. Said process requires very expensive equipment and in general requires a machining of the parts, given shrinkages that are not quite isotropic. The densities obtained may be very close to the theoretical density, for pure SiC [3], or lower, for the other UHTC ceramics, depending on the compositions and the temperature and pressure conditions [2]. The materials obtained may have excellent mechanical properties.

The SPS method is similar to the HIP method, with very high pressures and temperatures, but with a heating by a high-intensity electric field passing through the part to be densified. Said method is applicable just as well to SiC [3] as to UHTC ceramics [2]. The very short duration, typically a few minutes, of said method makes it possible to prevent a growth of grains and thus makes it possible to obtain materials having excellent mechanical properties [6].

The reactive sintering methods may be classified into two categories, namely the so-called Reactive Hot Processing (RHP) methods and the so-called Reactive Spark Plasma Sintering (RSPS) methods [2]. Said methods consist of densifying, by HIP or by SPS, parts that contain, before treatment, that is to say in the raw state, elements that will chemically react with one another at high temperature. Said elements are in general metals, such as Zr, or metalloids, such as Si, or even $B_4C$. Thus, the elements Zr, Si and $B_4C$ will give by reaction the particulate composite $ZrB_2$—SiC—ZrC.

The reactive methods involving a molten metal (reaction bonded, Liquid sintering, or Melt Infiltration (MI)) [6] [2] [3] [7] consist of making a molten metal or metalloid, (for example silicon, at a temperature greater than 1400° C.) react with C, optionally in the presence of other UHTC type compounds. The metal or metalloid reacts with carbon to give a carbide. Complex reactions occur notably of dissolution, precipitation, and sintering [3]. Said technique is relatively simple but almost systematically leads to the presence of free metal or metalloid making the material more sensitive to oxidation, or having degraded mechanical properties, in particular at high temperature [7].

The PDC method [8] consists of pyrolysing the polymers precursor of the ceramic that is desired to be obtained. Thus, if it is desired to prepare SiC, a polycarbosilane will be used as precursor polymer. Said method gives excellent results for the synthesis of ceramic fibres. But it is difficult with said method to obtain monolithic parts. Furthermore, the parts obtained have relatively low densities and poor mechanical properties [8] [6].

The PIP method is derived from the PDC method, previously described, transposed to the production of composite materials with fibrous reinforcements. It is necessary to carry out several cycles of impregnation-pyrolysis of polymers, due to rather low densification yields. However, the yield may be improved by mixing with the polymer nanometric powders of the compound to be densified. Nevertheless, said method is long, expensive and the residual porosities of the materials obtained are rather high [9].

The chemical vapour deposition (CVD) method makes it possible notably to obtain depositions of SiC, by decomposition of gaseous precursors such as methyltrichlorosilane (MTS, $CH_3SiCl_3$), diluted in hydrogen, between 900° C. and 1400° C., at low pressure. The material obtained is homogeneous and has good mechanical properties. The applications are generally limited to coatings or to parts of low thickness [10].

The CVI method [9] is a method similar to the CVD method, wherein the depositions are performed within a substrate, in general fibrous, and not on the substrate, as is the case for the CVD method, in order to obtain ceramic composite materials.

The main advantage of the CVI method is the relatively low temperature, compatible with ceramic fibres, with which said method is implemented. Other advantages of said method are the absence of free silicon, and the possibility of producing complex parts. The main drawback of this method is the low densification speed. The densification speed may be increased by operating with a pressure gradient, which makes it possible to obtain the densification of parts of 5 mm in 5 days. Nevertheless, said duration still remains relatively long [9]. Another way of reducing the densification durations, is the coupling of the CVI method with the PIP method, before or after the CVI method [9]. The addition of powders during the PIP method has also been studied and makes it possible to reduce the cracks inherent to the PIP method.

Even with a number of PIP cycles that may be significant, that may range for example from 7 to 14, the final density remains moderate (2.3 to 2.6) [11].

In order to remedy the problem of slowness of densification and of homogeneity of the material, a modified, "reactive", CVI method has been proposed [7]. In said modified method, particles having a carbon or carbide phase are impregnated into the preform, by PIP, which phase subsequently react with the gaseous phase. The reaction thickness is homogeneous, but nevertheless very low, in the order of around one hundred nm, for particles of 600 nm, after 20 h of reaction, at 950° C., for a part of only 0.6 mm of thickness. In document [7], it is also indicated that the conventional CVI method, on C powders, even at low kinetics (for example 300 nm/h), however higher than in the reactive CVI method), leads to external cloggings and to gradients of thicknesses of deposition.

Furthermore, document JP-A-2003-238249 [12] describes, according to claim 1, and the "Abstract", a glass ceramic material that comprises 10% to 70% by mass of ceramic particles made of a crystallised ceramic, of an average diameter of 3 micrometres or more.

Said crystallised ceramic particles are dispersed in a matrix that comprises an amorphous phase and a crystalline phase.

The dispersed crystallized particles may be made of SiC but the matrix is exclusively a mixture of oxides that gives an amorphous phase, and a crystalline phase (by precipitation in the amorphous phase).

It would seem that the amorphous phase forms a layer that at least partially covers the outer surface of the particles.

Said amorphous phase layer is not porous.

Furthermore, claim 2 of said document indicates that the thickness of the amorphous phase is less than or equal to 500 nm which is much lower than the thickness of 1000 to 10000 nm (0.1 to 1 microns), which is the preferred thickness of the porous layer made of at least one second ultra-high-temperature ceramic in amorphous form of the material according to the invention.

Document US-A1-2003/162647 [13] describes, according to claim 1, a material consisting of a composite ceramic with fibres including:
- a dense fabric or cluster of three-dimensional oriented fibres with a high thermal conductivity.
- a crystalline matrix of SiC-β, which is created by a CVI method essentially on the fibres.
- a matrix component of SiC-β, which is created in the pores of the fabric and/or cluster structure by a polymer infiltration and pyrolysis method, starting from a suspension of silicon carbide powder in a polymer, and
- another matrix component made of SiC-β, which is created by a CVI method in the cracks and pores of the material, due to the preceding pyrolysis method.

The materials and the implementation method concerned by said document are based on the use of dense fibrous structures, and are, thereby, very different from the particulate composite materials that are the subject matter of the present invention. The implementation method also does not include step of generating porosity by the use of pore-forming agents to facilitate the access of gas for the CVI densification.

It follows from the foregoing that the known particulate composite ceramic materials obtained by the known methods are not satisfactory, have many drawbacks and insufficient properties notably thermal and mechanical properties.

Similarly, the known methods for preparing ceramic materials are not satisfactory, have many drawbacks notably by the use of high temperatures and pressures, or, when the synthesis temperatures are lower and without pressure, lead to materials that themselves are not satisfactory notably for use at high temperature, due to the presence of sintering additions.

DESCRIPTION OF THE INVENTION

Said aim, and still others are achieved, in accordance with the invention by a particulate composite ceramic material, comprising, preferably consisting of:
- particles made of at least one first ultra-high-temperature ceramic (UHTC) in crystallised form, the outer surface of said particles being at least partially covered by a porous layer made of at least one second ultra-high-temperature ceramic in amorphous form, said first ultra-high-temperature ceramic (UHTC) in crystallised form representing 25% to 90% by mass with respect to the mass of the material and said second ultra-high-temperature ceramic in amorphous form representing 2 to 15% by mass with respect to the total mass of the material; and the particles together defining a space therebetween;
- optionally, porous clusters of said at least one second ultra-high-temperature ceramic in amorphous form, distributed in said space;

a dense matrix made of at least one third ultra-high-temperature ceramic in crystallised form at least partially filling said space;

optionally, a dense coating made of at least said third ultra-high-temperature ceramic in crystallised form, covering the outer surface of said matrix, said matrix and said coating representing 5% to 90% by mass with respect to the total mass of the material.

The term ceramic, within the meaning of the invention, also covers carbon.

The porosity of the porous layer made of at least one second ultra-high-temperature ceramic in amorphous form is generally 15% to 30%, preferably 15% to 25%, more preferably 15% to 20%. Said porosity is generally determined by Hg or He pycnometry, and $N_2$ or $CO_2$ adsorption isotherms.

For example, in the case where the second ultra-high-temperature ceramic is SiC from a polycarbosilane polymer, the porosity of the porous layer made of at least one second ultra-high-temperature ceramic in amorphous form may be 25%.

In the case where the second ultra-high-temperature ceramic is SiC from a polycarbosilane polymer, the density of the porous layer made of at least one second ultra-high-temperature ceramic in amorphous form may be approximately 2.4.

The size of the pores of the porous layer made of at least one second ultra-high-temperature ceramic in amorphous form may range for example from one nanometre to 10 μm. The size of the pores is generally determined by Hg or He pycnometry, and $N_2$ or $CO_2$ adsorption isotherms.

Advantageously, the porous layer made of at least one second ultra-high-temperature ceramic in amorphous form may have a thickness of 0.1 to 1 micron.

The thickness of the porous layer made of at least one second ultra-high-temperature ceramic in amorphous form also differentiates the material according to the invention from the material of document [12], because claim 2 of said document indicates that the thickness of the amorphous phase is less than or equal to 500 nm, which is much lower than the thickness of 1000 to 10000 nm (0.1 to 1 microns) which is the preferred thickness of the porous layer made of at least one second ultra-high-temperature ceramic in amorphous form of the material according to the invention.

The porosity and the size of the pores of the porous clusters of said at least one second ultra-high-temperature ceramic in amorphous form are generally equivalent to the porosity and to the size of the pores of the porous layer made of at least one second ultra-high-temperature ceramic in amorphous form.

The size of the clusters of said at least one second ultra-high-temperature ceramic in amorphous form is generally of 1 to 30 microns.

Dense matrix, (dense coating), without porosity, means that the density of said matrix (coating) is equal to or is close to the theoretical density, for example does not deviate from the theoretical density by more than 5%.

The overall porosity of the particulate composite ceramic material according to the invention, that is to say the porosity of the particulate composite ceramic material according to the invention taken as a whole may be greater than or equal to 5%, preferably 5% to 50%, more preferably 5% to 30%, better 10% to 20%. Said overall porosity is generally determined by Hg or He pycnometry, and $N_2$ or $CO_2$ adsorption isotherms.

The overall porosity of the ceramic material according to the invention also differentiates the ceramic composite material according to the invention from the material of document [12] that has, according to claim 3 of said document, an open porosity of 1% or less.

The size of the pores of the particulate composite ceramic material according to the invention may range for example from one nanometre to one hundred μm.

The size of the pores of the particulate composite ceramic material according to the invention is generally determined by Hg or He pycnometry, and $N_2$ or $CO_2$ adsorption isotherms.

The particulate composite ceramic material according to the invention may have one single or a plurality of porosity ranges.

Advantageously, said first, second and third ceramics may be selected from boride ceramics, carbide ceramics, nitride ceramics, silicide ceramics, carbon, and the mixtures thereof.

Preferably, said first, second and third ceramics may be selected from SiC, $MoSi_2$, TiC, TaC, ZrC, $ZrB_2$, HfC, $HfB_2$, BN, AlN, TiN, C, and the mixtures thereof.

In view of the preparation method described below, the first and second ceramics are generally selected from the ceramics that resist a chemical attack such as an attack by an acid.

Advantageously, said first, second and third ceramics may be identical.

Preferably, said first, second and third ceramics may all be SiC.

In this case, advantageously, the first ultra-high-temperature ceramic may be SiC in a crystallised form, the second ceramic may be amorphous porous SiC, and the third ceramic may be SiC in β crystallised form.

Advantageously, the matrix is prepared by a Chemical Vapour Infiltration (CVI) method.

Advantageously, the particles made of at least one first ultra-high-temperature ceramic (UHTC) in crystallised form may have an average size, defined by the largest dimension thereof, such as an average diameter, of 1 to 30 microns.

Advantageously, the porous layer made of at least one second ultra-high-temperature ceramic in amorphous form may have a thickness of 0.1 to 1 micron.

Advantageously, the matrix, for example made of SiC, may have a thickness of 0.5 to 10 microns.

Advantageously, the coating made of at least said third ultra-high-temperature ceramic in crystallised form, covering the outer surface of said matrix may have a thickness of 10 to 100 microns.

It can be considered that the material according to the invention comprises, preferably consists of, particles of SiC and/or of other ultra-high-temperature ceramics (UHTC), provided with a porous layer, inserted into a matrix of SiC and/or of other ultra-high-temperature ceramics (UHTC), said matrix being obtained preferably by Chemical Vapour Infiltration (CVI).

Thus, the material according to the invention has a specific microstructure with particles, a layer on each one of said particles, a matrix wherein are distributed said particles, and finally a coating on said matrix.

Furthermore, the particles are specifically crystallised ceramic particles, the layer on said particles is specifically a porous layer made of an amorphous ceramic, and finally the matrix and the coating are also specifically made of a crystallised ceramic.

Such a structure or microstructure has never been described or suggested in the prior art, as represented notably by the documents cited above.

The material according to the invention is different from conventional particulate composite ceramic materials, since the particles, grains of ceramic are not bound by a diffusion phenomenon occurring during a simple sintering process, under pressure or reactional, as is the case for the SiC [3] or other ultra-high-temperature ceramics (UHTC) [2].

On the contrary in the material according to the invention, the particles, each provided with a porous layer are distributed, inserted into a matrix obtained preferably by Chemical Vapour Infiltration (CVI). Thus, it can be considered that the particles are bound by means of said matrix.

The material according to the invention is also not a CVD type material, since in said materials obtained by CVD, there is only one continuous constituent that is deposited on a substrate, which in general is removed after the deposition [6].

The material according to the invention is also different from the materials previously described, obtained by CVI or by reactive CVI, because the material according to the invention, comprises, preferably consists of, particles made of at least one first ultra-high-temperature ceramic (UHTC), such as SiC, in crystallised form, the outer surface of each of said particles being at least partially covered by a porous layer made of at least one second ultra-high-temperature ceramic, such as SiC, in amorphous form (generally from a precursor polymer); a matrix made of at least one third ultra-high-temperature ceramic, such as SiC, in crystallised form (generally prepared by CVI) wherein are distributed said particles; and a coating made of at least said third ultra-high-temperature ceramic in crystallised form, such as SiC, covering the outer surface of said matrix.

The porous, amorphous phases of the layer that covers the particles, and also the dense matrix, constitute barriers for deviating cracks and confer a good toughness to the material according to the invention.

It should be noted that, in the material according to the invention, the dense matrix made of at least one third ultra-high-temperature ceramic in crystallised form at least partially fills the space defined between the particles. In other words, the matrix is dense and without porosity, but generally there is no matrix everywhere in said space, said space is generally not completely filled by said matrix and empty spaces remain in said space. This is due to the fact that said space is not very accessible, by diffusion, to chemical species enabling the deposition.

It can be said that in the material according to the invention in addition to the amorphous phases of the second ceramic and of the particles, grains of the first ultra-high-temperature ceramic (UHTC) in crystallised form, there is a dense matrix made of at least one third ultra-high-temperature ceramic in the form of a dense deposit (obtained notably by CVD and/or CVI), for example of theoretical density.

Said dense matrix may form a continuity through the material, may form a continuous phase throughout the material.

Said dense matrix made of at least one third ultra-high-temperature ceramic does not correspond to a material from powders or to grains from a crystallisation obtained by precipitation.

The proportions of the various constituents of the material according to the invention may be adjusted depending on the elaboration parameters, within the ranges defined above.

The material according to the invention has a very stable microstructure up to a high, or even very high, temperature, namely up to a temperature greater than or equal to 2000° C.

For example, in the case where the first, second and third ceramics are SiC, the material according to the invention has a very stable microstructure up to a high, or even very high, temperature, namely up to a temperature greater than or equal to 1500° C. or 1600° C.

This is due to the fact that there is no growth of the particles of the first ceramic, such as SiC, because, during the preparation method, there is no addition of compounds favouring the sintering so-called "sintering additions".

This is also due to the fact that there is little or no contact between the particles, because said particles are separated from one another by the porous layer made of at least one second ultra-high-temperature ceramic, such as SiC, in amorphous form (generally from a precursor polymer) and by the matrix made of at least one third ultra-high-temperature ceramic, such as SiC, in crystallised form (generally prepared by CVI).

The overall porosity of the material according to the invention, which is, as will be seen below, related to the elaboration method (namely to the techniques used in the various steps of the method such as the CVI, but also the other techniques) is adjustable, in a rather wide range, for example in a range of 5% to 50%, preferably of 5% to 30%, more preferably of 10% to 20%. Said porosity is generally determined by Hg or He pycnometry, and $N_2$ or $CO_2$ adsorption isotherms.

This may be of interest for applications such as filters or catalysis.

In such applications, the overall thickness of the material according to the invention is generally of 100 microns to 5 mm If the material is in the form of honeycomb structures, for applications of heat exchangers for example, the materials, such as walls or the ligaments also have thicknesses of 100 microns to 5 mm, but the overall thickness of the materials according to the invention may go up to several tens of centimetres. For example, 10, 20, 50 or 100 cm.

However, if high mechanical properties are sought, the material according to the invention should contain as much matrix as possible, which leads to an overall porosity of the material generally less than or equal to 20%, namely generally 10% to 20%.

The manufacturing cost of the material according to the invention is moderate, because as will be seen below, it is generally obtained by a low pressure and moderate temperature method.

The material according to the invention has a good behaviour at a high temperature, without adverse evolution of the microstructure thereof. Said good behaviour at a high temperature of the material according to the invention is due notably to the composition thereof, to the absence of sintering additions, to the absence of growth of the grains, particles and to the features of the matrix.

In other words, the material according to the invention has good mechanical and thermal characteristics, as well as adjustable porosity characteristics.

For example, the overall porosity of the material according to the invention may be located in the ranges already specified above.

The invention further relates to a part comprising, preferably consisting of, the particulate composite ceramic material according to the invention as described in the foregoing.

The parts may be parts for applications such as filters or catalysis.

In such applications, the overall thickness of the part according to the invention is generally of 100 microns to 5 mm If the parts are in the form of honeycomb structures, for applications of heat exchangers for example, the parts, such as walls or the ligaments also have thicknesses of 100 microns to 5 mm, but the overall thickness of the parts according to the invention may go up to several tens of centimetres. For example, 10, 20, 50 or 100 cm.

The invention also relates to the method for manufacturing a part made of a particulate composite ceramic material according to the invention as described in the foregoing.

Said method comprises the following successive steps:
a) a part is prepared, said raw or green part, comprising a mixture of a powder of particles of the first ceramic and of a powder of particles of a refractory pore-forming material capable of being eliminated by a chemical attack, a precursor polymer of the second ceramic, and a solvent of said polymer;
b) the solvent is evaporated and the precursor polymer of the second ceramic is crosslinked;
c) a heat treatment is performed to transform the polymer into the second ceramic, which is in the form of a porous layer that at least partially covers the outer surface of the particles of the first ceramic, and optionally of porous clusters;
d) the refractory pore-forming material is eliminated by a chemical attack, whereby a part is obtained comprising the particles of the first ceramic, the second porous ceramic that is in the form of a porous layer that at least partially covers the outer surface of said particles and optionally of porous clusters, and an internal porosity between said particles;
e) treatment of the part obtained at the end of step d) by a chemical vapour infiltration (CVI) technique in order to deposit the third ceramic in the internal porosity of the part;
f) optionally, deposition of the third ceramic on the outer surface of the part obtained at the end of step e) by a chemical vapour deposition (CVD) technique.

The method according to the invention comprises a specific sequence of specific steps that has never been described or suggested in the prior art.

The method according to the invention does not have the drawbacks, defects, limitations and disadvantages of the methods of the prior art, such as the methods described above and it provides a solution to the problems of said methods.

The method according to the invention mainly consists, of producing during the first steps a) to d) thereof a porous material with the base particles of the first ceramic. Said porosity subsequently makes it possible to carry out an infiltration of the matrix by a CVI method and a deposition of the third ceramic, in high kinetic conditions.

In other words, the method according to the invention is mainly based on the creation of a porosity, within a ceramic granular structure, subsequently enabling a complement of ceramic densification by a gas process.

The method according to the invention is fundamentally distinguished from the methods of the prior art such as the methods described above.

Indeed, the pressureless sintering, HIP, SPS, or reactive sintering methods previously discussed, are based on a densification principle, namely by sintering, entirely different from the principle used in the method according to the invention. Said methods, based on the sintering therefore lead to materials having microstructures completely different from the claimed material.

It is the same for the methods using a reactive molten metal that leaves free metal in the obtained structure.

The PDC and PIP methods, which use polymers, lead to amorphous, very porous and cracked materials, unless said materials are brought to very high temperature.

The CVD method leads to a material with a single homogeneous phase, and is therefore not composite. Furthermore, said method compulsorily requires the presence of a substrate that must subsequently be eliminated.

The CVI and reactive CVI methods, for the densification of porous bodies containing powders, lead to very low matrix thicknesses and are very slow methods.

Also, the method according to the invention does not make use of any precipitation and does not comprise any precipitation step, whereas, in document [13] the material is obtained by precipitation techniques.

The method according to the invention and the material according to the invention do not generally use fibres, in contrast to the method of document [13]. More precisely, the powder of particles of the first ceramic and the powder of a refractory pore-forming material used in step a) of the method according to the invention are not present in the form of fibres, do not comprise fibres. In contrast, the method of document [13] requires fibres (step a) of the method of document [13], the proportion of fibres being at least 35% by volume (claim 5 of document [13]). Subsequently, SiC is deposited, essentially on the fibres, by a CVI method.

The method according to the invention does not make use of any sintering and does not comprise any sintering step whereas in document [13] the material is obtained by sintering techniques.

The method according to the invention generally uses temperatures less than 1600° C. or 1500° C., and without sintering addition, whereas SiC sinters without addition, at much greater temperatures.

The powder of particles of the first ceramic and the powder of particles of a refractory pore-forming material may comprise particles all having a form other than the form of fibres, for example particles in the form of spheres or of spheroids or else of polyhedra and not of fibres. The method according to the invention remedies the defects of the methods of the prior art, it makes possible a rapid and homogeneous densification, without shrinkage, at moderate temperature and without pressure, of ceramics such as SiC.

The method according to the invention has, inter alia, the following advantages with respect to the methods of the prior art:

It is inexpensive because it does not use high pressures and it uses relatively mild temperatures. Thus, generally, as already mentioned above, the method according to the invention uses temperatures less than 1600° C. or 1500° C.;

it is rapid for thicknesses that may go up to several mm; the material of the parts obtained is of a high purity; there is almost no limitation on the shape, geometry, and the size of the parts that may be prepared by the method according to the invention. The method according to the invention makes possible the preparation of parts of complex or even very complex geometries and/or of large sizes;

the method according to the invention makes it possible to produce parts, even parts of complex shapes, with a good dimensional control, without the need for machining.

In summary, the method according to the invention has the advantage of leading to parts with a controllable porosity, produced without sintering addition, at low pressure and moderate temperature, and that have a very good stability at high temperature and of good mechanical and thermal properties.

The method according to the invention notably has the specific feature of leading to a material wherein are combined three different types of microstructures.

These three microstructures are related to the creation of an open porosity path that makes possible a chemical vapour infiltration and that allows a residual porosity to persist, for example at most of 20%.

The preparation of the raw or green part of step a) generally comprises a step of preparing the mixture of a powder of particles of the first ceramic and of a powder of particles of the refractory pore-forming material capable of being eliminated by a chemical attack; and a step of forming, shaping the mixture of a powder of particles of the first ceramic, and of a powder of particles of the refractory pore-forming material capable of being eliminated, for example decomposed, by a chemical attack, in the form, shape of the raw or green part.

The first ceramic has already been described above.

Pore-forming material means a material that during the elimination thereof makes possible the creation of a porosity within the part.

Indeed, the refractory pore-forming material powder, such as a plaster powder will thereafter be eliminated (during step d) of the method) to then generate a porosity in the part. In said porosity, the third ceramic will be able to be deposited by a chemical vapour infiltration (CVI) technique with a kinetics that may be high.

A high density of the raw, green part is not sought. The role of the refractory pore-forming material such as plaster is to create, once that it will have been eliminated, an access path to all of the porosities of the material (except for the microporosity of the layer), for making possible a vapour, gas, densification with high kinetics.

The pore-forming material is a refractory material.

Refractory material means a material capable of supporting without degradation the temperatures used during subsequent steps of the method, notably during step c).

Generally, the refractory pore-forming material is selected from the materials capable of withstanding a temperature greater than 300° C., preferably greater than 400° C., more preferably greater than 600° C., better greater than 800° C., even better greater than 1000° C.

Material capable of being eliminated by a chemical attack generally means a material that can be decomposed, under the cation of a chemical compound such as a base or an acid.

Advantageously, the refractory pore-forming material is selected from plaster, potassium carbonate, calcium carbonate, and potassium sulphate ($K_2SO_4$).

The preparation of the mixture of the powder of particles of the first ceramic, and of the powder of particles of the refractory pore-forming material capable of being eliminated by a chemical attack may be carried out by a dry process or by a wet process.

The forming, shaping of the mixture of a powder of particles of the first ceramic, and of a powder of particles of the refractory pore-forming material capable of being eliminated by a chemical attack may be carried out by a conventional technique, such as moulding or slip casting, or with a filter press.

Or else the forming, shaping may be carried out by a less conventional technique, such as an additive manufacturing technique, for example a technique of projecting a binder on a bed of powder by using a mixture of a powder of particles of the first ceramic, such as SiC, and of a powder of a refractory pore-forming material.

Advantageously, the powder of particles of the first ceramic and/or the powder of particles of the refractory pore-forming material capable of being eliminated by a chemical attack are powders that can be qualified as large dimensions, that is to say powders whereof the average dimension (for example the diameter) of the particles is generally greater than or equal to 10 microns.

A pore-forming material having such a dimension of particles is more easily eliminated by a chemical attack.

The addition of the precursor polymer (also called pre-ceramic polymer) of the second ceramic, generally diluted in a solvent, in order to favour the impregnation, may be carried out during the step of preparing the mixture, notably by a wet process, of a powder of particles of the first ceramic, and of a powder of particles of the refractory pore-forming material capable of being eliminated by a chemical attack.

The solvent is generally an organic solvent that may be selected, notably as regards the polycarbosilane polymers (SiC precursors) from toluene, hexane, tetrahydrofuran, cyclohexane, xylene, and the mixtures thereof.

Or else, the addition of the precursor polymer of the second ceramic may be carried out during the step of forming, shaping the mixture of a powder of particles of the first ceramic, and of a powder of particles of the refractory pore-forming material capable of being eliminated by a chemical attack.

Or even, the addition of the precursor polymer of the second ceramic may be carried out after the step of forming, shaping the mixture of a powder of particles of the first ceramic, and of a powder of particles of the refractory pore-forming material capable of being eliminated by a chemical attack, in the form of a raw or green part.

Preferably, said addition is carried out by soaking the raw or green part in a solution of the polymer, more preferably under vacuum.

The quantity of polymer employed is lower than in the conventional methods using polymers (PDP or PIP method) since the main objective is simply to make possible a sufficient pre-consolidation of the parts to enable the manipulation thereof during the various following steps of the method.

By way of example, the raw or green part may comprise 30 to 80% by mass of powder of the first ceramic, such as SiC, 17 to 67% by mass of refractory pore-forming material, such as plaster, and 3% to 25% by mass of polymer (this is the mass of pure polymer, excluding solvent, knowing that the polymer may be diluted up to a factor 20 in a solvent). Such proportions by mass advantageously make it possible to obtain both a good infiltrability in the CVI method and to give good mechanical properties to the material, to the part.

By way of comparison, the quantity of polymer used in the conventional methods is generally 30% to 50% by mass.

Advantageously, the precursor polymer (pre-ceramic polymer) of the second ceramic may be selected from polycarbosilanes, polysilazanes, polyborosilanes and the mixtures thereof.

During step b) of the method according to the invention, the solvent is evaporated and the precursor polymer of the second ceramic is crosslinked.

Said step is generally carried out by heating the raw, green, part, for example by treating the raw, green, part in the oven under inert gas to evaporate the solvent and crosslink the polymer.

During step c) of the method according to the invention, a heat treatment is performed to transform, convert the polymer into the second porous ceramic, which is in the form of a porous layer that at least partially covers the outer surface of each of the particles of the first ceramic, and optionally of porous clusters.

The second ceramic, from the polymer, being porous or being in the form of clusters, this favours the access of the chemical attack reagent, such as an acid, to the pore-forming material such as plaster in order to eliminate said material during the following step.

Said heat treatment is generally produced at a temperature of 600° C. to 1600° C., preferably of 800° C. to 1500° C., more preferably of 1000° C. to 1200° C.

The second ceramic is in amorphous form.

It can be said that the heat treatment for transforming the polymer into the second porous ceramic is a pyrolysis and therefore that the amorphous phase of the second ceramic is coming from the pyrolysis of a polymer which is absolutely not the case in document [13].

Steps b) and c) of the method may be grouped and constitute a single step, during which a heat treatment is performed by progressively increasing the temperature to first of all evaporate the solvent and crosslink the precursor polymer of the second ceramic, then transform, convert the polymer into the second ceramic the temperature then being generally of 600° C. to 1600° C., preferably of 1000° C. to 1200° C.

During step d) of the method, the refractory pore-forming material is eliminated by decomposition, by a chemical attack, whereby a part is obtained comprising the particles of the first ceramic, the second porous ceramic and/or in the form of clusters and an internal porosity, of open type, between said particles.

In other words, during said step, the pore-forming material is eliminated in order to only keep the first ceramic, such as SiC, corresponding to the initial powder, and the second ceramic, such as SiC, from the pre-ceramic polymer, and the access paths are created for the chemical infiltration of the next step.

Advantageously, during step d), the chemical attack may be performed with a solution of an acid, preferably of a mineral acid, such as hydrochloric acid. Preferably, this is a concentrated solution of an acid, for example a solution of hydrochloric acid at 37%.

The attack, for example with a solution of an acid may be performed hot, for example at a temperature of 50° C. to 70° C.

At the end of said step d), the part may be washed, for example with water, then dried.

During step e) of the method according to the invention, the treatment of the part obtained at the end of step d) is then carried out by a chemical vapour infiltration (CVI) technique in order to deposit the third ceramic in the internal porosity of the part.

The conditions of the vapour infiltration technique—notably temperature, pressure, mixture of gases used, proportion of gases in the gas mixture, precursor of the ceramic, duration—allowing deposition of the third ceramic in the internal porosity of the part may be easily determined by the person skilled in the art in this technical field.

Thus, the infiltration conditions may be the following when the third ceramic is SiC:
Temperature: 900° C. to 1300° C.;
Pressure: 1 kPa to 30 kPa;
SiC precursor(s): $CH_3SiCl_3$ or mixture of $SiHCl_3$ and of $CH_4$;
Gas mixture used: Hydrogen and SiC precursor;
Ratio of the [$H_2$]/[SiC precursor such as $CH_3SiCl_3$] gas flow rates: 1 to 20;
Duration: 5 h to 150 h.

Examples of infiltration conditions may be the following when the third ceramic is SiC:
Temperature approximately 1050° C., pressure 10 kPa, ratio of the [$H_2$]/[$CH_3SiCl_3$] gas flow rates=5, duration 24 h; or else
Temperature 950° C., pressure 4 kPa, ratio of the [[$H_2$]/[$CH_3SiCl_3$] gas flow rates=4, duration 40 h.

At the end of step e), optionally, during optional step f) of the method of the invention, deposition of the third ceramic on the outer surface of the part obtained at the end of step e) is carried out by a chemical vapour deposition (CVD) technique.

The conditions of the chemical vapour deposition (CVD) technique—notably temperature, pressure, mixture of gases used, proportion of gases in the gas mixture, precursor of the ceramic, duration—allowing deposition of the third ceramic on the outer surface of the part obtained at the end of step e) may be easily determined by the man skilled in the art in this technical field. The same conditions as those used in the chemical vapour infiltration (CVI) technique may be used in the chemical vapour deposition (CVD) technique, or else the pressure, the flow rates and the temperature may be increased, in order to increase the deposition speed.

The part comprising, preferably consisting of, the material according to the invention may find its application in a number of fields, due to the thermal conductivity properties, the mechanical, electrical (semi-conductor) properties, the refractory character (refractoriness), the chemical inertia, and the neutron behaviour of the material according to the invention, notably when the first, and the third ceramic or preferably, the third ceramics are SiC.

Said fields are, inter alia, the fields of semi-conductors, chemistry, aeronautical industry, space industry, and nuclear industry.

For example, the part comprising, preferably consisting of the material according to the invention may constitute all or part of a heat exchanger, of a catalysts support, of a filter operating in a corrosive atmosphere (for example for the filtration of gaseous by-products of containers containing radioactive compounds) and/or at a high temperature, of a furnace part or of a furnace, of a heating resistor, of a combustion chamber, of a varistor, of a substrate for power components, of a shielding, of a rolling component, or of an abrasive coating.

Figure 4:
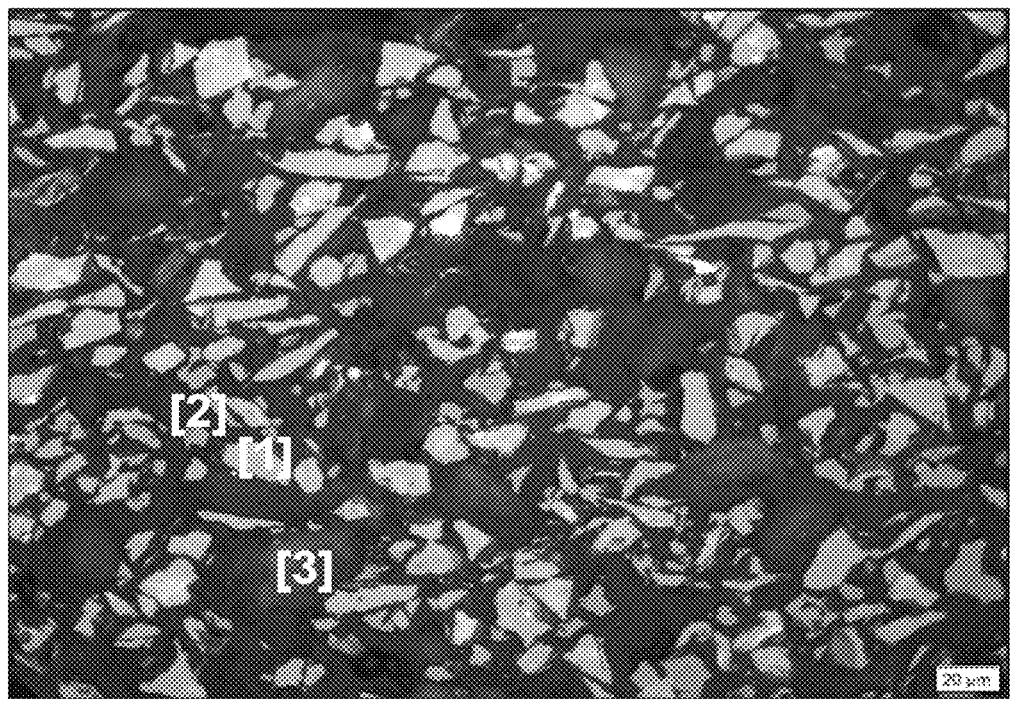
FIG. 4 is a photograph taken in optical microscopy that shows the microstructure of the material constituting the part obtained after the souring step in Example 1.

The scale shown in FIG. 4 represents 20 μm.

Figure 5:
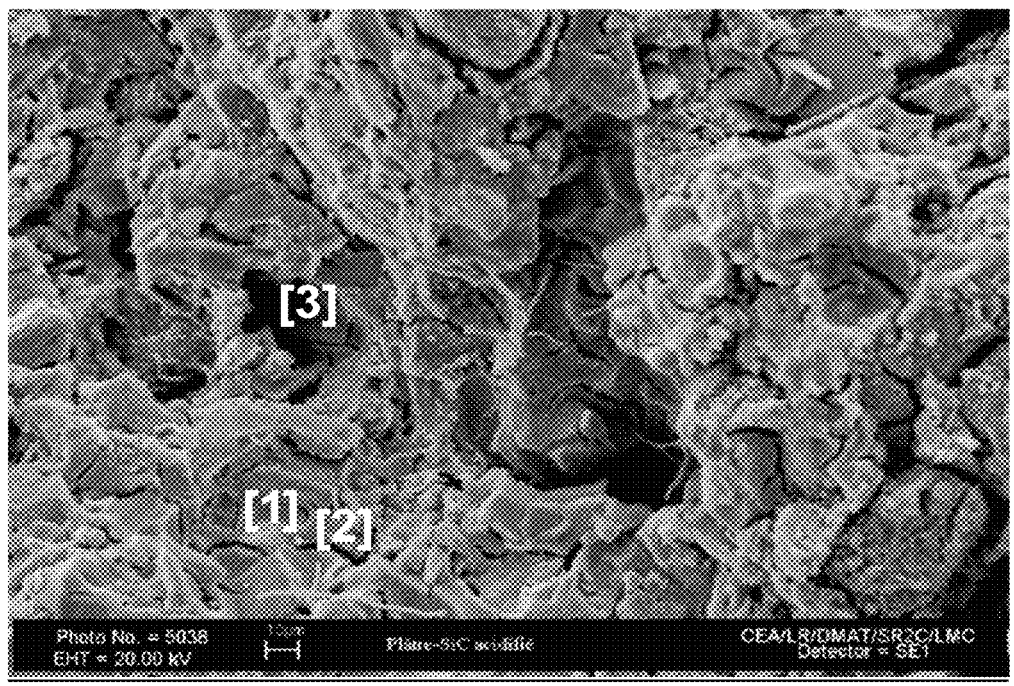

FIG. 5 is a photograph taken in scanning electron microscopy (SEM) that shows the microstructure of the material constituting the part obtained after the souring step in Example 1.

The scale shown in FIG. 5 represents 10 μm.

Figure 6:
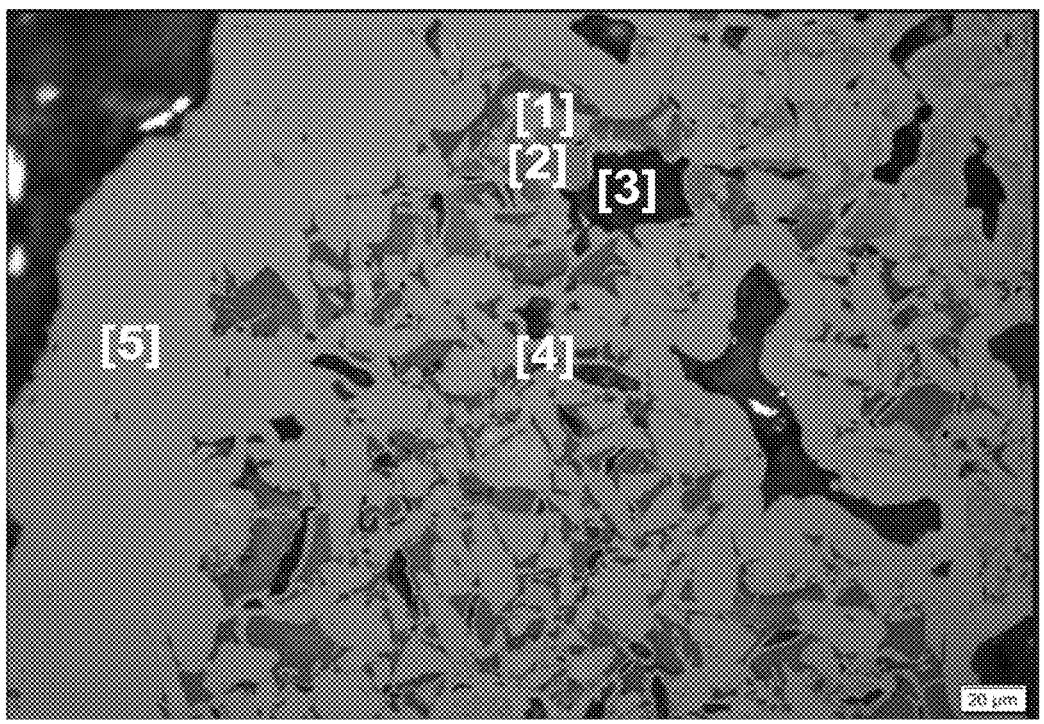

FIG. 6 is a photograph taken in optical microscopy that shows the microstructure of the material constituting the final part obtained in Example 1.

The scale shown in FIG. 6 represents 20 µm.

Figure 7:
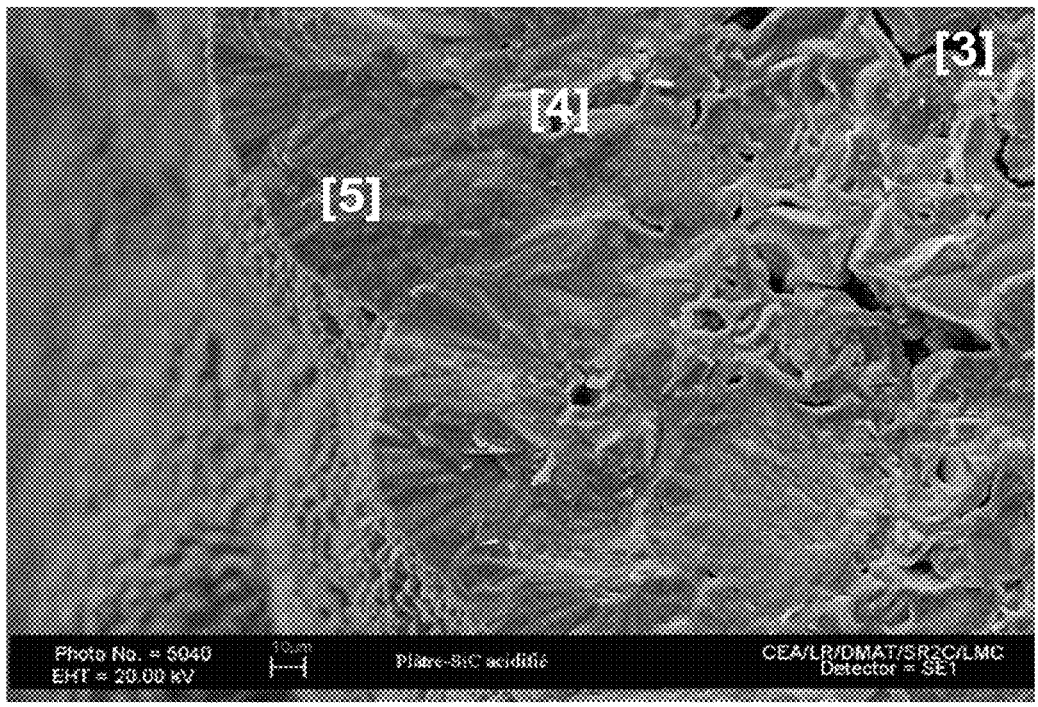

FIG. 7 is a photograph taken in scanning electron microscopy (SEM) that shows the microstructure of the material constituting the final part obtained in Example 1.

The scale shown in FIG. 7 represents 10 µm.

DETAILED DESCRIPTION OF SPECIFIC EMBODIMENTS

The invention will now be described with reference to the following examples, given for illustrative and non-limiting purposes.

Example 1

Production of a Part with Lattice Structure Made of SiC, Formed, Shaped by Additive Manufacturing.

In this example, a lattice structure made of SiC, which is formed by additive manufacturing, is manufactured by the method according to the invention.

First of all, a mixture of a plaster powder and of a SiC powder is prepared.

The SiC powder is mixed with the plaster powder, in the proportions of 70% by mass of SiC, and of 30% mass of plaster.

The SiC powder is available from Sigma Aldrich®, under the reference 357391, the SiC powder has a particle size of 400 mesh.

The plaster powder is available from 3D System®, under the reference ZP® 151. It is in fact according to the technical data sheet a "High Performance Composite" that is to say plaster with a few additives.

The mixture is performed by dry process, in a plastic bottle of 1 L, shaken using a so-called "turbulat" powder mixer available from Bioengineering® of 80 W power. The mixture is performed at 20 revolutions/min.

A "raw" "green" part with lattice structure is printed by additive manufacturing, using a Z-Printer® 310 printer available from Z Corporation®.

In order to imprint said part with lattice structure, the powder mixture previously prepared is used, placed in suspension in the Pro-1® colourless binder available from 3D Systems®, in the printhead of the printer.

Figure 2:
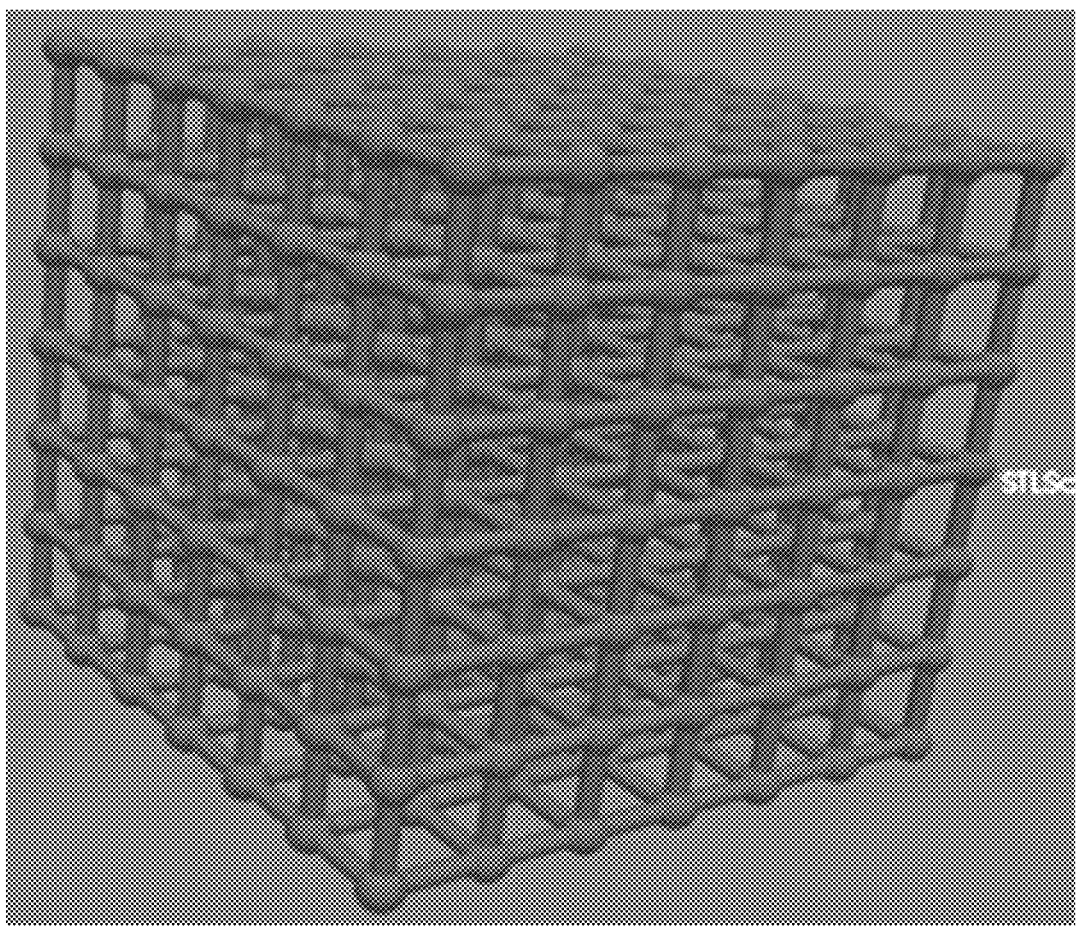
FIG. 2 shows the digital model of the lattice structure of FIG. 1. Said digital model has been created with CAD software.

The digital model of the lattice structure is shown in FIG. 2, it has been created with CAD software.

The printing is performed with standard printing parameters, namely with a layer thickness of 100 microns, a printing speed of 20 mm/h along the z-axis (that is to say the vertical axis with respect to the building tray). The part is recovered after drying at 120° C. in the oven.

Figure 1:
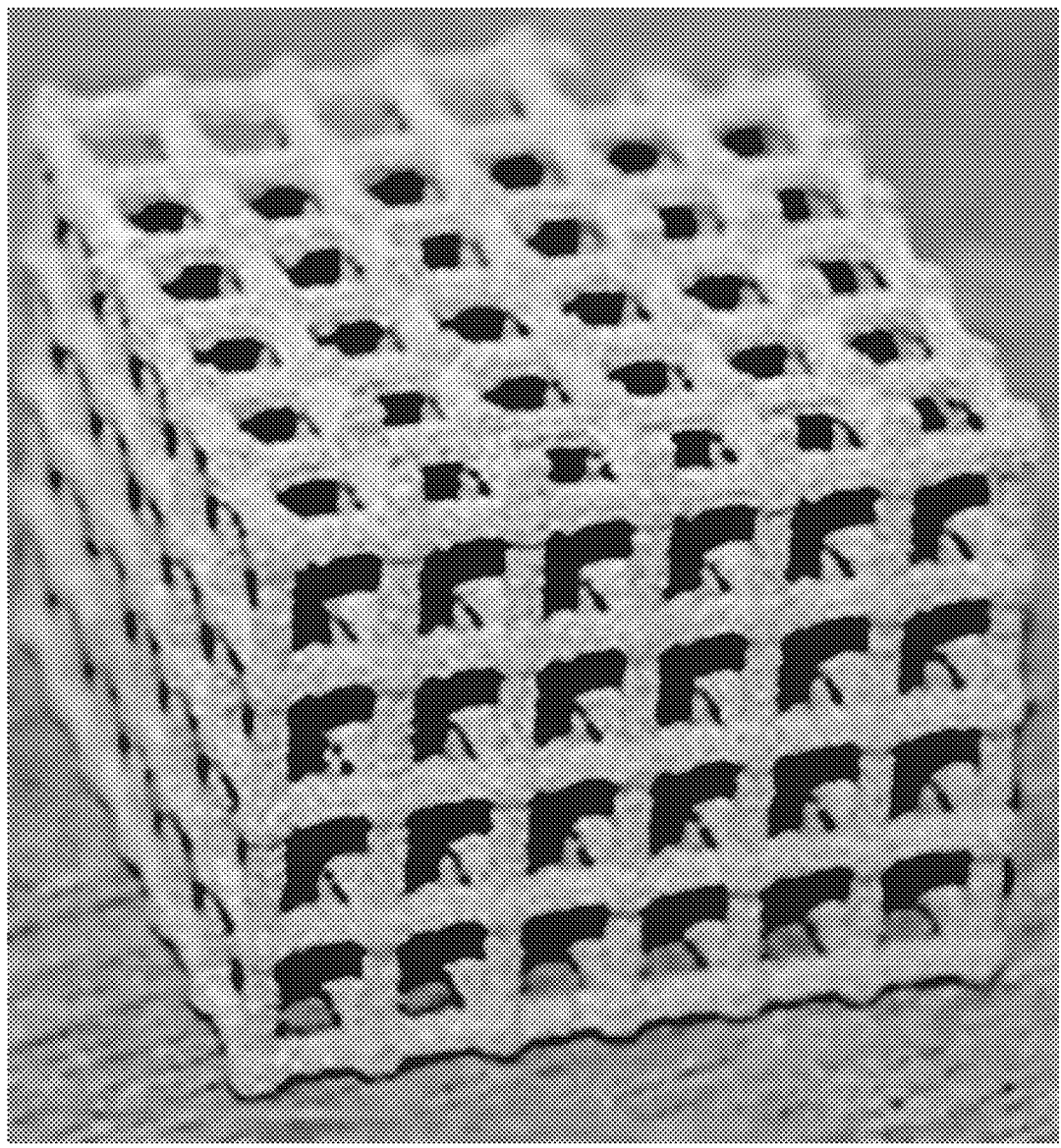
FIG. 1 shows the raw, green, part, with lattice structure prepared in Example 1.

FIG. 1 shows the raw, green, part, with lattice structure obtained. Said part consists of a mixture of plaster, of SiC and of binder.

The lattice has ligaments of 1.3 mm of diameter, the dimension of the cells is 5 mm×5 mm×5 mm, and the number of cells is 216 (6×6×6).

The raw, green, part is then placed on a support, and the part is immerged into a mixture of 65% by mass of polycarbosilane (compound available from Starfire Systems® under the name StarPCS™ SMP-10) and of 35% by mass of toluene, in an enclosure under vacuum.

The part is then removed from the enclosure and dried in an oven at 250° C., then treated at 1000° C. for 1 h under inert gas.

The part obtained consists of 45% by mass of SiC from the polycarbosilane polymer.

The part is then placed in a solution of concentrated hydrochloric acid (37%), at 60° C., for 2 hours, in order to eliminate the plaster by decomposition and dissolution. Said step is called souring step.

The part is subsequently washed with water then dried.

FIG. 4 is a photograph taken in optical microscopy that shows the microstructure of the material constituting the part obtained after the souring step, the washing with water, and the drying.

FIG. 5 is a photograph taken in scanning electron microscopy (SEM) that shows the microstructure of the material constituting the part obtained after the souring step, the washing with water, and the drying.

FIGS. 4 and 5 show:
[1] SiC grains;
[2] amorphous SiC from the polymer;
[3] a porosity.

Finally, the part is placed in a CVI furnace with the following infiltration conditions: temperature approximately 1050° C., pressure 10 kPa, ratio of the $[H_2]/[CH_3SiCl_3]$ gas flow rates=5, duration 24 h.

After the densification, the part consists of 17% by mass of SiC from the polymer, of 21% by mass of particulate SiC and of 62% by mass of SiC deposited by CVI. The average density of the ligaments is 2.5 g/cm$^3$.

Figure 3:
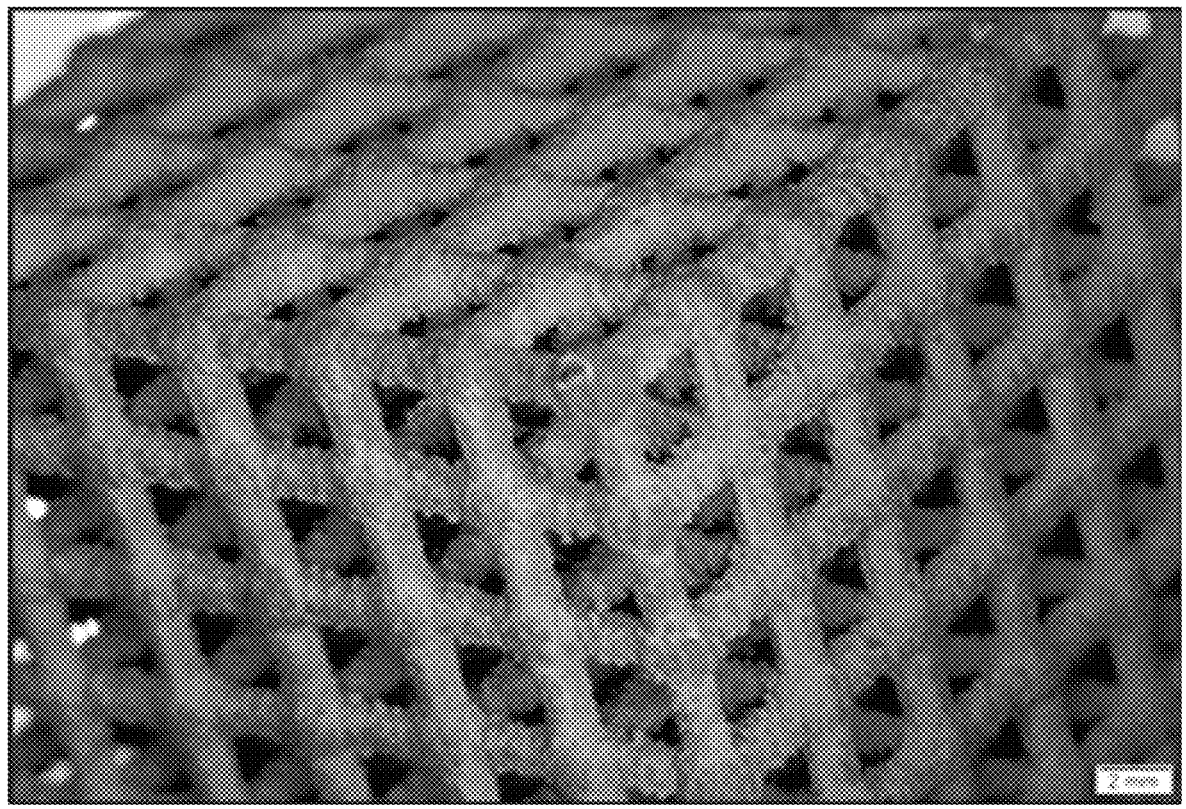
FIG. 3 shows the final part made of SiC obtained in Example 1.

FIG. 3 shows the final part made of SiC obtained in this example.

FIG. 6 is a photograph taken in optical microscopy that shows the microstructure of the final material constituting the part obtained.

FIG. 7 is a photograph taken in scanning electron microscopy (SEM) that shows the microstructure of the final material constituting the part obtained.

FIGS. 6 and 7 show:
[1] SiC grains;
[2] amorphous SiC from the polymer;
[3] a porosity;
[4] SiC deposited by CVI;
[5] SiC deposited by CVD.

Example 2

Production of a Plate Made of MoSi$_2$—SiC.

In this example, a plate made of MoSi$_2$—SiC is manufactured, by the method according to the invention.

The procedure is the same as in Example 1, but with the following differences:
- a base powder of MoSi$_2$, available from H.C. Starck under the name Amperit® 920-054 (particle size 15-45 microns), instead of a SiC powder, is mixed with the plaster powder, in the mass proportions of 80% MoSi$_2$ and of 20% plaster.
- a plate of 10 cm×2 cm×3 mm is obtained by mixing the preceding powder with a solution of 65% of polycarbosilane and 35% of toluene (% by mass), then casting in a mould.
- the part is subsequently placed in a CVI furnace with the following infiltration conditions: temperature 950° C., pressure 4 kPa, ratio of the $[H_2]/[CH_3SiCl_3]$ gas flow rates=4, duration 40 h.

The other steps, impregnation, pyrolysis, heat treatments and elimination of the plaster are carried out in the same conditions as in Example 1.

The part obtained consists, by mass, of 78% of $MoSi_2$, of 17% of SiC obtained by CVI, and of 5% of SiC from the polymer.

The part has a density of 4.4 g/cm$^3$.

REFERENCES

[1] "*UHT Ceramics: densification, properties and thermal stability*", J. F. Justin, Journal Aerospace Lab, Issue 3, p 1-11, November 2011.
[2] "*Ultrahigh temperature ceramic-based composites*", Y. Kawaga, p 273-292, in Ceramic Matrix Composites, Wiley and Sons, 2015.
[3] "*Sintering additives for SiC based on the reactivity: a review*", K. Raju, Ceramics International 42, p 17947-17962, 2016.
[4] "*Volumetric receivers in Solar Thermal Power Plants with Central Receiver System technology: A review*", A. Avila Marin, *Solar Energy*, vol. 85, pp. 891-910, 2011.
[5] "*Pressureless sintering of HfB$_2$-SiC ceramics*", D. W Ni, Journal of the European Ceramic Society 32 (2012) 3627-3635.
[6] "*Additive free hot-pressed SiC ceramics—A material with exceptional mechanical properties*", P. Sagjgalik, Journal of European Ceramic Society 36, 1333-1341, 2016.
[7] "*Procédé de fabrication de matériau composite à matrice carbure*", S. Jacques, FR-A1-3 004 712, of 19 Apr. 2013.
[8] "*Polymer-Derived Ceramics: 40 years of research and innovation in Advanced Ceramics*", P. Colombo, J. Am. Ceram. Soc., 93, [7], 1805-1837, 2010.
[9] "*C/SiC and C/C-SiC composites*", B. Heidenreich, p 147-216, in Ceramic Matrix Composites, Wiley and Sons, 2015.
[10] "*Chemical vapor deposited silicon carbides articles*", Lais Kevin D., patent, EP 1 970 358 A1 of 17 Sep. 2008.
[11] "*Manufacturing SiC-fiber-reinforced SiC matrix composites by improved CVI/slurry/Infiltration/Polymer impregnation and pyrolysis*", C. A Nannetti, J. Am. Ceram. Soc. 87 [7] 1205-1209, 2004.
[12] JP-A-2003-238249.
[13] US-A1-2003/162647.

The invention claimed is:

1. A particulate composite ceramic material, comprising:
particles comprising a first ultra-high-temperature ceramic in crystallized form, an outer surface of the particles being at least partially covered by a porous layer comprising a second ultra-high-temperature ceramic in amorphous form, the first ultra-high-temperature ceramic being present in a range of from 25 to 90 mass %, and the second ultra-high-temperature ceramic being present in a range of from 2 to 15 mass %, each with respect to total particulate composite ceramic material mass, and the particles defining a space therebetween;
optionally, porous clusters of the second ultra-high-temperature ceramic in amorphous form, distributed in the space;
a dense matrix comprising a third ultra-high-temperature ceramic in crystallized form at least partially filling the space;
optionally, a dense coating comprising the third ultra-high-temperature ceramic in crystallized form, covering the outer surface of the dense matrix,
wherein the dense matrix and, optionally further the dense coating, are present in a range of from 5 to 90 mass %, with respect to the total particulate composite ceramic material mass,
wherein the porosity of the porous layer is in a range of from 15 to 30%,
wherein the first, second, and third ultra-high-temperature ceramics comprise a boride, carbide, nitride, silicide, and/or carbon.
2. The material of claim 1, having an overall porosity greater than or equal to 5%.
3. The material of claim 1, wherein the porous layer has a thickness of 0.1 to 1 micron.
4. The material of claim 1, wherein the first, second, and third ultra-high-temperature ceramics independently consist of one or more boride ceramics, carbide ceramics, nitride ceramics, silicide ceramics, carbon, or mixtures thereof.
5. The material of claim 4, wherein the first, second, and ultra-high-temperature third ceramics are independently selected from the group consisting of SiC, $MoSi_2$, TiC, TaC, ZrC, $ZrB_2$, HfC, $HfB_2$, BN, AlN, TiN, carbon, and mixtures thereof.
6. The material of claim 1, wherein the first, second, and third ultra-high-temperature ceramics are identical.
7. The material of claim 6, wherein the first, second, and third ultra-high-temperature ceramics are SiC.
8. The material of claim 7, wherein the first ultra-high-temperature ceramic is SiC in a crystallized form,
wherein the second ceramic is amorphous porous SiC, and
wherein the third ceramic is SiC in β crystallized form.
9. The material of claim 1, which is formed using temperatures less than 1600° C.
10. The material of claim 1, wherein the third ultra-high-temperature ceramic is deposited by chemical vapor infiltration.
11. The material of claim 1, having a maximum residual porosity of 20%.
12. A part, comprising:
the particulate composite ceramic material of claim 1.
13. The part of claim 12, which is at least part of a heat exchanger, of a catalyst support, of a filter operating in a corrosive atmosphere and/or at a high temperature, of a furnace part or of a furnace, of a heating resistor, of a combustion chamber, of a varistor, of a substrate suitable for a power component, of a shielding, of a rolling component, or of an abrasive coating.
14. A method for manufacturing the part of claim 12, the method comprising:
(a) preparing a raw or green part, comprising a mixture of a powder of particles of the first ultra-high-temperature ceramic and of a powder of particles of a refractory pore-forming material capable of being eliminated by a chemical attack, a precursor polymer of the second ultra-high-temperature ceramic, and a solvent of the precursor polymer;
(b) evaporating the solvent and crosslinking the precursor polymer of the second ultra-high-temperature ceramic;
(c) performing a heat treatment to transform the precursor polymer into the second ultra-high-temperature ceramic, which is in the form of a porous layer that at least partially covers the outer surface of the particles of the first ultra-high-temperature ceramic, and optionally of porous clusters;
(d) eliminating the refractory pore-forming material by a chemical attack, whereby a part is obtained comprising the particles of the first ultra-high-temperature ceramic, the second ultra-high-temperature ceramic in porous form as a porous layer that at least partially covers the outer surface of the particles and optionally of porous clusters, and an internal porosity between the particles;

(e) treating the part obtained at the end of the eliminating (d) by a chemical vapor infiltration technique in order to deposit the third ultra-high-temperature ceramic in the internal porosity of the part; and (f) optionally, depositing the third ultra-high-temperature ceramic on the outer surface of the part obtained at the end of the treating (e) by a chemical vapor deposition technique.

15. The method of claim 14, wherein the preparing (a) comprises:

preparing the mixture of a powder of particles of the first ultra-high-temperature ceramic and of a powder of particles of the refractory pore-forming material capable of being eliminated by a chemical attack; and forming, shaping the mixture of a powder of particles of the first ultra-high-temperature ceramic, and of a powder of particles of the refractory pore-forming material capable of being eliminated by a chemical attack, in the form shape, of the raw or green part.

16. The method of claim 14, wherein the refractory pore-forming material is capable of withstanding a temperature greater than 300° C.

17. The method if claim 16, wherein the refractory pore-forming material comprises plaster, potassium carbonate, calcium carbonate, or potassium sulfate.

18. The method of claim 14, wherein preparation of the mixture of the powder of particles of the first ultra-high-temperature ceramic, and of the powder of particles of the refractory pore-forming material is carried out by a dry process or by a wet process.

19. The method of claim 14, wherein forming, shaping of the mixture of a powder of particles of the first ultra-high-temperature ceramic, and of a powder of particles of the refractory pore-forming material is carried out by molding, by slip casting, with a filter press, or by an addictive manufacturing technique.

20. The method of claim 14, wherein the precursor polymer of the second ceramic, is added during preparing the mixture of the powder of particles of the first ultra-high-temperature ceramic, and of the powder of the refractory pore-forming material; or during forming and/or shaping the mixture of a powder of particles of the first ultra high-temperature ceramic, and of a powder of particles of the refractory pore-forming material; or after the forming and/or shaping.

21. The method of claim 14, wherein the precursor polymer, which is a pre-ceramic polymer, of the second ultra-high-temperature ceramic comprises a polycarbosilane, polysilazane, and/or polyborosilane.

22. The method of claim 14, wherein the evaporating (b) and the performing (c) are grouped.

23. The method of claim 14, wherein during the performing (c) the heat treatment is carried out at a temperature in a range of from 600° C. to 1600° C.

24. The method of claim 14, wherein, during the eliminating (d), the chemical attack is performed with a solution comprising an acid.

* * * * *